United States Patent
Tonoli et al.

(10) Patent No.: US 9,175,742 B2
(45) Date of Patent: Nov. 3, 2015

(54) ELECTROMAGNETIC DAMPER FOR ROTATING MACHINES

(75) Inventors: Andrea Tonoli, Avigliana (IT); Mario Silvagni, Occhieppo Inferiore (IT)

(73) Assignee: ROLLS ROYCE PLC, London (GB)

( * ) Notice: Subject to any disclaimer, the term of this patent is extended or adjusted under 35 U.S.C. 154(b) by 131 days.

(21) Appl. No.: 13/322,093

(22) PCT Filed: May 17, 2010

(86) PCT No.: PCT/EP2010/003014
§ 371 (c)(1),
(2), (4) Date: May 4, 2012

(87) PCT Pub. No.: WO2010/133333
PCT Pub. Date: Nov. 25, 2010

(65) Prior Publication Data
US 2012/0212111 A1    Aug. 23, 2012

(30) Foreign Application Priority Data

May 22, 2009   (IT) .............................. TO2009A0389
May 10, 2010   (IT) .............................. TO2010A0387

(51) Int. Cl.
*F16F 7/10*   (2006.01)
*F16F 15/18*   (2006.01)

(52) U.S. Cl.
CPC ..................................... *F16F 15/18* (2013.01)

(58) Field of Classification Search
CPC ....................................................... F16F 15/18

USPC .................. 188/378–380, 158, 161, 164, 167; 318/4, 59, 60, 61, 62; 310/51, 68 B, 310/90.5

See application file for complete search history.

(56) References Cited

U.S. PATENT DOCUMENTS

| | | | |
|---|---|---|---|
| 4,367,413 A | | 1/1983 | Nair |
| 4,620,752 A * | | 11/1986 | Fremerey et al. ............ 310/90.5 |
| 5,053,662 A * | | 10/1991 | Richter ......................... 310/90.5 |
| 5,404,063 A * | | 4/1995 | Mills ............................. 310/266 |
| 6,208,497 B1 * | | 3/2001 | Seale et al. .................... 361/160 |
| 6,543,588 B1 | | 4/2003 | Raad |
| 8,373,298 B2 * | | 2/2013 | Barber ............................ 290/55 |

OTHER PUBLICATIONS

International Search Report for International Application No. PCT/EP2010/003014 mailed Sep. 16, 2010.

* cited by examiner

*Primary Examiner* — Pamela Rodriguez
(74) *Attorney, Agent, or Firm* — Merchant & Gould P.C.

(57) ABSTRACT

Electromagnetic damper (1) for rotating machines (100) having at least a stator (103) and a rotating shaft (100); the electromagnetic damper (1) is able to damper the vibrations of the rotating machine (100) during its functioning. The damper includes windings (2) of electrically conducting material, for generating a magnetic field; a magnetic circuit (4), for conveying within it a magnetic flux generated by the windings (2); a power supply (8), for supplying the windings (2) of electrically conducting material; the power supply (8) of the electromagnetic damper (1) is positioned inside the rotating machine (100).

13 Claims, 3 Drawing Sheets

ELECTROMAGNETIC DAMPER FOR ROTATING MACHINES

This application is a National Stage Application of PCT/EP2010/003014, filed 17 May 2010, which claims benefit of Serial No. TO2009A000389, filed 22 May 2009 in Italy and Serial No. TO2010A000387, filed 10 May 2010 in Italy and which applications are incorporated herein by reference. To the extent appropriate, a claim of priority is made to each of the above disclosed applications.

FIELD OF THE INVENTION

This invention relates to the field of the auxiliary devices for the functioning of rotating machines and, particularly, to an electromagnetic damper for rotating machines.

BACKGROUND OF THE INVENTION

It is known that the traditional rotating machines are subjected to vibrations during their functioning.

Said vibrations originate from multiple causes, many of them to be related to a non-optimal balancing of the parts in motion of the rotating machines that, during the movement, changes into a force variable in time that induces the machine itself to vibrate.

Even if light vibrations of the rotating machines can be tolerated in particular non-critical environments, there are also multiple applications wherein said rotating machines cannot vibrate, or must maintain their vibration to extremely reduced levels in any operating conditions, at low and high charge, and on a rather wide rotation speed interval.

Particularly—but not necessarily—in aeronautical applications and on aircrafts in detail, rotating machines (typically jet engines) that require a particular care for what concerns the reduction of vibrations are used. As a matter of fact, the vibrations produced by a rotating machine can induce vibrations to all the parts of the aircraft and therefore indirectly also within the nacelle.

The vibrations of a rotating machine can have a fixed frequency or a frequency that varies with the variation of the rotation speed of the machine itself, as well as they can increase or diminish in their intensity on the component in fundamental frequency and/or on the harmonics as a consequence for example of charge transients imposed to the machine itself; moreover, the vibration frequencies of the rotating machine can cause resonance to delicate parts of the nacelle.

Other applications that require the damping of the vibrations comprise for example industrial rotating machines and tools with rotating parts.

Damping systems of mechanical type for vibrations are known, for example constituted by masses eccentrically positioned on one or more rotating parts of the rotating machine, so that to generate in turn forces as much equivalent and opposite as possible for drastically reducing the vibrations of the machine itself.

However, said systems are not efficient and can be only empirically and not in series optimized. Namely, the working tolerances of the parts of the rotating machine, as well as other constructive differences, that are inevitably present during the production in series more or less extended on the rotating machines, cause to have rotating machines that vibrate in a slightly different way one from another.

Furthermore, said masses inevitably contribute to the weight increase of the rotating machine upon which they are installed, and this can be unacceptable for determined application fields.

Said masses, if not correctly fixed to the rotating part, can be subjected to detachment or movement events with the serious risk of increasing the vibrating behavior of the machine upon which they are mounted.

Systems of active vibration damping of a rotating machine that use electro-mechanic technologies are known. Said systems are rather complex and typically require supplying systems and electronic control systems outside the rotating machine itself.

There are particular applications of rotating machines, that include in a non restrictive way, also the aeronaval field, wherein the transfer of the control system of the active vibration damping system is complex, extremely expensive and dangerous.

For example, bringing said control system from an aircraft engine to the interior of a nacelle, on the aircraft wing or even only outside the engine but still within the nacelle that encloses it, is heavy in terms of weight (because of the copper conductors that must go at least in a straight way along the whole wing of the aircraft and must be redundant for security reasons), as well as dangerous (a long conductor can damage itself, ground part of the electric signal, cause short-circuits and fires).

Furthermore, the existing regulations impose limiting restraints related to the electromagnetic emissions of the circuit on the surrounding environment. In fact, as it is known, the navigational instrumentation is particularly sensitive to the radio interferences caused by spurious electromagnetic emissions of electronic circuits, and the risk of interference on the normal functioning of the navigational instrumentation is absolutely unacceptable in terms of security.

Moreover, said types of control systems are subjected to the risk of electric blackout. For example, in case of even only a temporary lack of power supply, an electronic control system of a complex type does not work anymore and it often requires a rather long resetting (particularly if it is complex and is partially controlled by means of a dedicated software platform, this case being called reboot) that is unacceptable in critical applications such as the aeronautical industry.

DISCLOSURE OF THE INVENTION

The aim of the present invention is to realize an electromagnetic damper for rotating machines, that is free of the above-described disadvantages.

According to the present invention, an electromagnetic damper for rotating machines having at least a stator and a rotating shaft is realized; the electromagnetic damper being able to damper the vibrations of said rotating machine during its functioning and comprising:

a plurality of windings of electrically conducting material, for generating a magnetic field;

a magnetic circuit, for conveying within it a magnetic flux generated by said plurality of windings;

a power supply, for supplying said windings of electrically conducting material; the power supply is positioned inside said rotating machine.

The power supply has outputs electrically connected to said windings and wherein said windings are supplied with a supply voltage that increases as the number of turns of said shaft of the rotating machine increases.

Another aim of the present invention is to provide an electromagnetic damper wherein said supply voltage increases for all the rotation speeds of the shaft that are inferior to a critical speed. The voltage generated by said power supply remains constant when said shaft rotates at speeds that are higher than said critical speed or equal to it.

Alternatively, the voltage generated by said power supply diminishes when said shaft rotates at speeds that are higher than said critical speed or equal to it.

The power supply is an alternator that generates a sinusoidal voltage and the outputs are connected to the windings by means of voltage rectification means for transforming the sinusoidal voltage into a direct voltage.

The shaft of the rotating machine is mounted on at least a bearing; said bearing being surrounded by a fixed support. The fixed support operates also as support for an elastic means for sustaining said shaft in a direction parallel to its axis; said elastic means operates by means of the centering of said shaft in any direction orthogonal to its rotation axis.

The fixed support is realized in metallic material and fully surrounds said bearing.

The magnetic circuit comprises a first internal part and a second external part, separated between them; said first internal part annularly surrounding said fixed support and identifying a ring positioned on a plane orthogonal to the direction identified by the rotation axis of said shaft; said second external part being substantially of annular form and being separated by said first internal part by an air gap; said first internal part having a maximum diameter substantially inferior than the minimum diameter of said second external part. The critical speed or speeds are rotating speeds of said shaft wherein there is the maximum of the vibrations of said rotating machine.

The power supply is electrically connected to said windings by means of a plurality of means of rectification of the electric voltage generated by said power supply; said plurality of means of rectification having inputs connected to said outputs of the power supply and outputs connected to said windings.

Another aim of the present invention is to provide an electromagnetic damper wherein the windings are also connected to additional resistive means, for tuning the action of said electromagnetic damper depending on the vibration frequency of said rotating machine; said resistive means being selected on the basis of size and behaviour of said rotating machine and of its functioning characteristics.

BRIEF DESCRIPTION OF THE DRAWINGS

The invention will be now described with reference to the appended drawings, that illustrate a not restrictive example of embodiment, wherein.

DETAILED DESCRIPTION OF THE INVENTION

Figure 1:
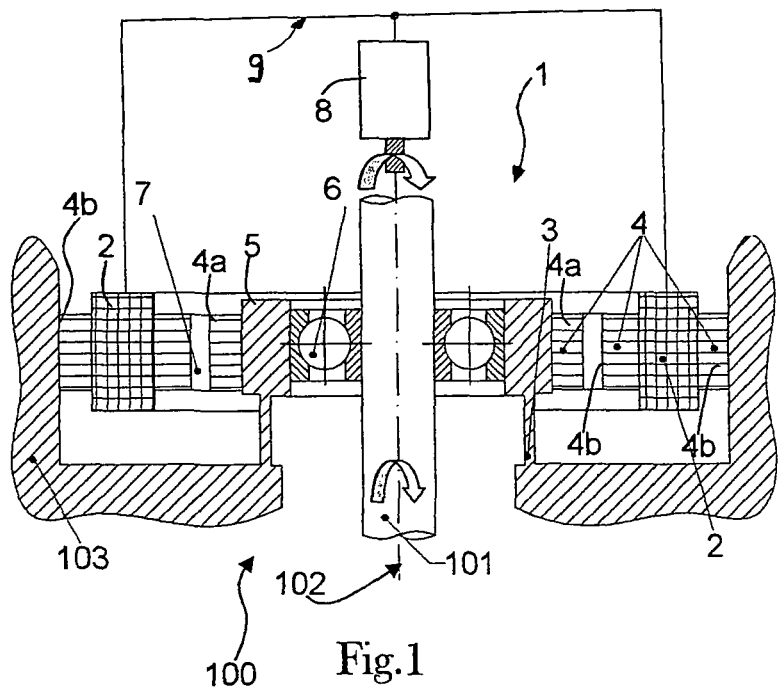
FIG. 1 shows a sectional view of a rotating machine provided with an electromagnetic damper according to the present invention.

With reference to FIG. 1, an electromagnetic damper for rotating machines is designated as a whole with the numeral 1. The electromagnetic damper 1 is installed on a rotating machine 100, having a shaft 101 rotating around its axis 102 and a case 103, for surrounding the internal parts of the rotating machine 100 and that realizes at least part of the stator structure of the rotating machine 100. More in detail, the shaft 101 is pivoted to the so called rotor of the rotating machine 100, not illustrated for the sake of simplicity of representation.

The electromagnetic damper 1 comprises:

a plurality of windings 2, constituted by a low ohmic loss electric conductor wound up many times on the shaft 101 and insulated on its external surface by a film of electrically insulating material;

a spring 3, for supporting the shaft 101 along a direction substantially parallel to its rotation axis 102 and for acting as centering elastic means in a direction substantially orthogonal to the axis 102;

a magnetic circuit 4;

a power supply 8, for supplying the winding 2 by means of a plurality of electric conductors 9.

The power supply 8 is positioned inside the rotating machine 100 and, therefore, does not require long supply wirings.

More in detail, the spring 3 is fixed for one side to the case 103 of the rotating machine 100 and for the other side to a fixed support 5 of annular type and typically realized in metallic material, within a bearing 6 is splined on. In this way, the spring 3 is integral with the case 103 of the rotating machine 100, and operates on the shaft 101 having a minimum mechanical friction and allowing the oscillation toward any direction orthogonal to the axis 102.

The magnetic circuit 4 comprises a first internal part 4a and a second external part 4b, coaxial and separated between them by an air gap 7 that substantially possesses an annular form of diameter comprised between a minimum equal to the maximum diameter of the first internal part 4a and a maximum equal to the minimum diameter of the second external part 4b. The first internal part 4a is fixed on the external side of the fixed support 5, at least partially surrounding it and realizing therefore a sort of ring oriented on a plane substantially orthogonal to the direction identified by the axis 102 of the shaft 101; the second external part 4b is instead fixed to the windings 2, that are supplied by the power supply 8, that also realizes a sort of ring oriented as the previous one.

Concerning the windings 2, their minimum quantity required for ensuring the functioning of the electromagnetic damper 1 is equal to four, in order to effectively control the flexional vibrations of the shaft 101.

The functioning of the electromagnetic damper 1 is essentially based on the size variation of the air gap 7 as a consequence of the vibration of the shaft 101 during its rotation.

Each winding 2 is supplied by the power supply 8 that generates a substantially constant voltage if the number of turns of the shaft 101 of the rotating machine 100 is maintained constant during the time; consequently, the power supply 8 generates, inside the magnetic circuit 4, a magnetic flux whose intensity varies as the size of the air gap 7 varies.

Figure 2:
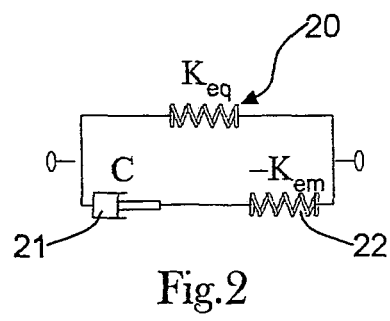
FIG. 2 shows a layout of the mechanical equivalent of the electromagnetic damper shown in FIG. 1.

Therefore, as shown in FIG. 2, the equivalent mechanical layout of the electromagnetic damper 1 of FIG. 1 is constituted by an elastic element 20 that is connected in parallel to a series of a compensation element 21 and an elastic element 22. In detail:

the elastic element 20 represents the behavior of the spring 3 and of the electromagnet formed by the magnetic circuit 4 and by the winding 2;

the compensation element 21 represents all the zones of the electromagnetic damper 1 wherein there is a damping behaviour (and therefore not comparable, concerning the functioning, to a spring);

the elastic element 22 is instead related to the sole electromagnet and mechanically operates in an opposite way in comparison with the elastic element 20.

This means that when the spring 3 tends to centre the rotating shaft 101 toward it, the magnetic circuit and the windings 2 generate a force of opposite value, that pulls the shaft 101 towards the external part of the damper itself. However, said force is distributed in a radial way on all the windings 2, and therefore is in any case balanced.

Figure 3:
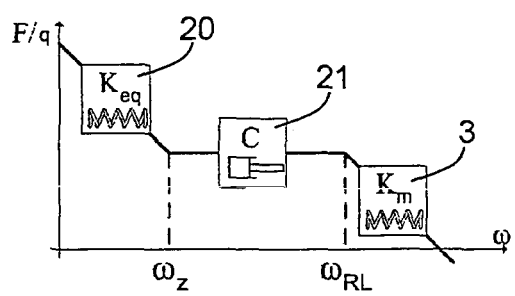
FIG. 3 shows a diagram that shows a characteristic of force and damping standardized depending on the angular rotation speed of the rotating machine of FIG. 1.

The damping characteristics and, therefore, the force applied to the electromagnetic damper depend on the rotation speed ω of the shaft 101, as shown in FIG. 3. More in detail, the curve of the intensity force exerted by the electromagnetic damper 1 presents a first bend in correspondence with a first inferior cut-off frequency $\omega_z$ and a second bend in correspondence with a second superior cut-off frequency $\omega_{RL}$, substantially superior to the first inferior cut-off frequency $\omega_z$. In the interval comprised between the first inferior cut-off frequency $\omega_z$ and the second superior cut-off frequency $\omega_{RL}$, the curve of the force exerted by the electromagnetic damper 1 remains substantially constant.

More in detail, the first inferior cut-off $\omega_z$ is given by the properties of the mechanical resonance of the rotating machine 100; the second superior cut-off frequency $\omega_{RL}$ is the cut-off frequency given instead by the electrical characteristics of the windings 2.

For these reasons, for low-frequency vibrations mainly operate the spring 3 and the magnetic circuit 4 (identified by the elastic element 20); on the contrary, for vibrations characterized by a very high frequency, and in detail higher than $\omega_{RL}$ mainly operates the spring 3, that in this case is represented by a block with constant $K_m$.

In detail, the windings 2 present an impedance having a purely resistive component and a reactive component (in detail it is of inductive type) that result in an equivalent electric circuit whose behavior varies when the frequency of the electric signal on its input varies.

Figure 4:
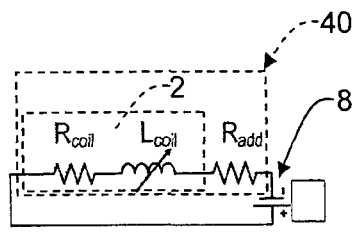
FIG. 4 shows an equivalent wiring diagram of the rotating machine and related electromagnetic damper as shown in FIG. 1.

In detail, as shown in FIG. 4, the windings 2 can namely be represented with an equivalent circuit constituted by a series of a power supply 8, a variable inductor $L_{coil}$, a first resistor $R_{coil}$ and a second resistor $R_{add}$ and where:

the first resistor $R_{coil}$ represents the resistance of the windings 2 themselves;

the second resistor $R_{add}$ represents additional resistances (such as for example the contact resistance between the generator and the metallic conductor of the winding 2) and eventual additional resistances required for tuning the cut-off frequencies $\omega_{RL}$ and $\omega_z$ on the basis of the size and behavior of the rotating machine 100;

finally, the variable inductor $L_{coil}$ represents the inductive component given by the wound up conductor that forms the windings 2.

Clearly, the variability of the inductance presented by the inductor $L_{coil}$ is caused by the fact that the air gap 7 is variable and, therefore, is not an intrinsic variability but an indirect one.

The first resistor $R_{coil}$, the second resistor $R_{add}$ and the variable inductor $L_{coil}$ represent a global impedance 40 of each of the winding 2.

Figure 5:
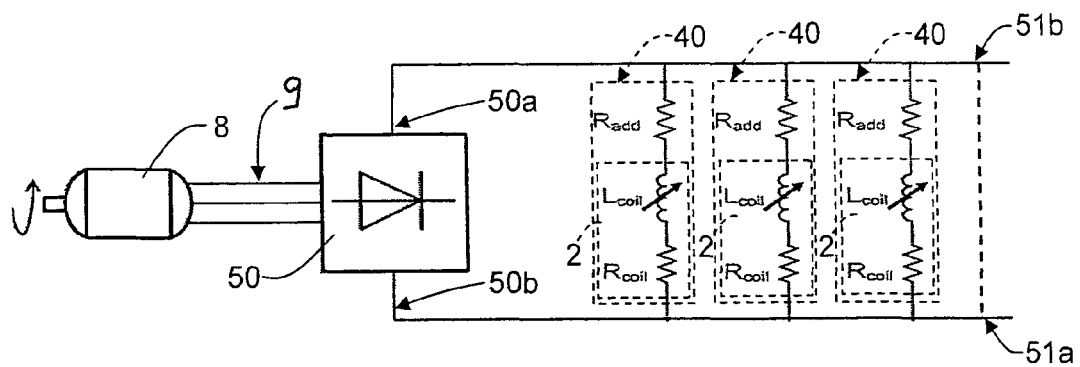
FIG. 5 shows a general equivalent wiring diagram comprising the rotating machine and related electromagnetic damper as shown in FIG. 1.

FIG. 5 shows a general electric block diagram of the electromagnetic damper 1, wherein the power supply 8 comprises at least a three-phase alternator that generates on its three outputs 9 a signal having a waveform of a sinusoidal type as mentioned above. In order to use said signal for supplying the windings 2, that from the electric point of view are connected in parallel between them, it has to be rectified by means of rectifying systems such as, for example, a link diode bridge 50 having the inputs connected to the outputs 9 of the power supply 8 and two outputs 50a, 50b connected to a couple of nodes 51a, 51b respectively to which are connected in parallel the impedances 40.

The FIG. 5 shows for the sake of simplicity the equivalent layout of three windings 2, but said number is solely given by the simplicity of representation. Namely, having six windings 2, there should be six branches connected each-other in parallel.

The power supply 8 is positioned inside the rotating machine 100; in detail, the alternator is therefore, is splined on the shaft 101 itself. For this reason, if the rotating machine 100 is operating, the electromagnetic damper 1 is necessarily supplied. Consequently, the electromagnetic damper 1 is self-supplied, because it does not require power supplies positioned outside the rotating machine and, moreover, it ensures a drastic reduction of the number of cablings and controls to be used for its functioning.

Given that the power supply 8 is constituted by one or more alternators, it is known that they generate a tension that is proportional to the number of turns of the shaft 101; therefore, the damping that can be obtained with low rotation speeds, even if it is enough to ensure the correct avoidance of vibrations, results limited when compared with the one that can be obtained when the shaft 101 increases it rotation speed.

Figure 6:
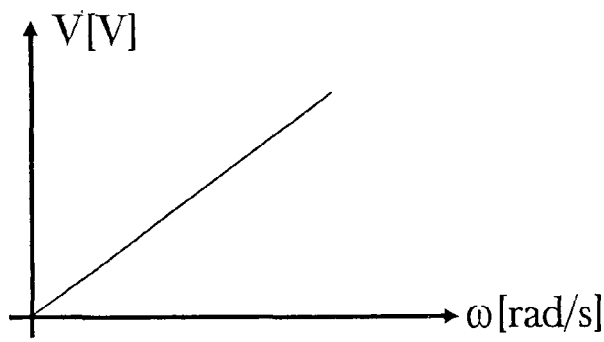
FIG. 6, FIG. 7 and FIG. 8 show respective functioning diagrams of an electric generator used in the electromagnetic damper according to the present invention.

Furthermore, the power supply 8 has typically a characteristic voltage-rotation speed of the shaft 101 of linear type, as shown in FIG. 6.

Figure 7:
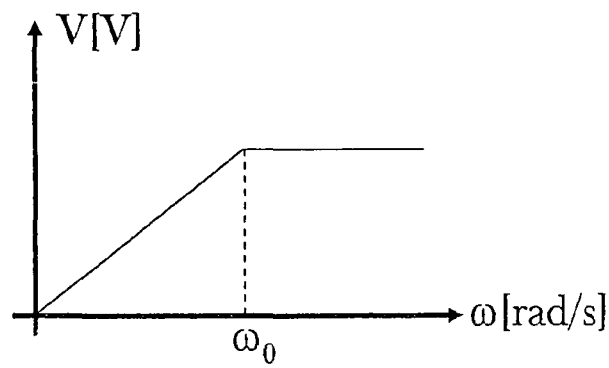

However, it is possible to use also a power supply that over a rotation speed $\omega_0$ (see FIG. 7), generates a constant voltage V that does not increase any more. Therefore, the voltage V remains constant as the rotation speed ω varies for each $\omega > \omega_0$.

Figure 8:
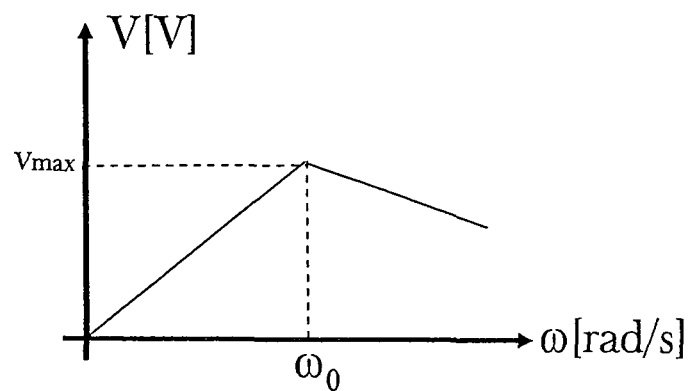

Alternatively, the power supply 8, for rotation speed ω for each $\omega > \omega_0$, diminishes the voltage delivered in comparison with the maximum Vmax, as shown in FIG. 8.

This last solution results particularly efficient for containing the vibrations when the voltage peak Vmax is simultaneously reached with the critical speed of the rotating machine 100. As a matter of fact, having defined the critical speed as the rotation speed $\omega_0$ wherein there is the vibrations maximum, the maximum effect of the electromagnetic damper 1 is equal to the maximum of the vibrations themselves. Once the critical rotation speed is passed, the damping diminishes, reducing the vibration transmissibility and their propagation toward the stator part of the rotating machine 100.

The benefits of the electromagnetic damper 1 are known according to the description above. Particularly, the electromagnetic damper 1 is self-supplied, and its power supply is generated inside the rotating machine itself. For this reason, it is not necessary to have complex devices for external supply that include cable of considerable length (particularly for aeronautical applications) with the consequent reduction of the weight required for the installation and the reliability increase.

In detail, the reliability increase is given by the fact that if the rotating shaft 101 rotates, also the power supply 8 is directly activated and without the interposition of mechanical and electrical parts that can concur to increase the risk of faults; eventual faults can derive only from the breaking of the power supply itself or of one of the supply cables connected to the outputs 9 but not in case of a blackout of the electrical equipment that is present where the rotating machine 100 is positioned.

Some variants can be applied to the device described up to this point. More in detail, for security reason, the number of electric generators for the supplying of the electromagnetic circuit can be redundant and this also applies for the connecting cables of the outputs 9 to the electromagnetic generator 1.

Furthermore, voltage generators of synchronous and asynchronous type can be used, or electrical axial flow engines, used as generators, particularly efficient in terms of relationship between size and electrical power delivered.

The invention claimed is:

1. An electromagnetic damper for rotating machines having at least a stator and a rotating shaft; said electromagnetic damper being configured to damp vibrations of said rotating machine during functioning and comprising:
   a plurality of windings of electrically conducting material, the circuit generating a magnetic field;
   a magnetic circuit conveying within a magnetic flux generated by said plurality of windings;
   a power supply supplying said windings of electrically conducting material; wherein said power supply is positioned inside said rotating machine and comprises a generator or alternator, the generator or alternator being directly connected to the rotating shaft and is permanently connected to the windings to automatically supply electric power to the windings at all times while the shaft is rotating; and
   the magnetic circuit comprises a first internal part and a second internal part, the first internal part and the second internal part being coaxial and defining an air gap between the first internal part and the second internal part, wherein in use, intensity of the magnetic flux varies as size of the air gap varies to damp vibrations.

2. An electromagnetic damper according to claim 1, wherein said power supply has outputs electrically connected to said windings and wherein said windings are supplied with a supply voltage that increases as the number of turns of said shaft of the rotating machine increases.

3. An electromagnetic damper according to claim 2, wherein said supply voltage increases for all rotation speeds of the shaft that are less than a critical speed.

4. An electromagnetic damper according to claim 3, wherein said voltage generated by said power supply remains constant when said shaft rotates at speeds that are higher than said critical speed or equal to said critical speed.

5. An electromagnetic damper according to claim 3, wherein said voltage generated by said power supply diminishes when said shaft rotates at speeds that are higher than said critical speed or equal to said critical speed.

6. An electromagnetic damper according to claim 3, wherein said critical speed is a rotating speed of said shaft wherein there maximum vibrations of said rotating machine occur.

7. An electromagnetic damper according to claim 2, wherein said power supply is an alternator that generates a sinusoidal voltage and wherein said outputs are connected to said windings by voltage rectification means for transforming said sinusoidal voltage into a direct voltage.

8. An electromagnetic damper according to claim 2, wherein said power supply is electrically connected to said windings by a plurality of rectifiers of the electric voltage generated by said power supply; said plurality of rectifiers having inputs connected to said outputs of the power supply and outputs connected to said windings.

9. An electromagnetic damper according to claim 2, wherein additional resistive means are also connected to said windings, for tuning action of said electromagnetic damper depending on a vibration frequency of said rotating machine; said resistive means being selected on the basis of size and behavior of said rotating machine and of functioning characteristics.

10. An electromagnetic damper according to claim 1, wherein said shaft of the rotating machine is mounted on at least a bearing; said bearing being surrounded by a fixed support.

11. An electromagnetic damper according to claim 10, wherein said fixed support also operates as support for elastic means for sustaining said shaft in a direction parallel to a shaft rotation axis; said elastic means operate by centering said shaft in any direction orthogonal to the shaft rotation axis.

12. An electromagnetic damper according to claim 11, wherein said fixed support comprises metallic material and fully surrounds said bearing.

13. An electromagnetic damper according to claim 10, wherein said first internal part is separated from said second external part; said first internal part annularly surrounding said fixed support and identifying a ring positioned on a plane orthogonal to the direction identified by the rotation axis of said shaft; said second external part being substantially of annular form and being separated from said first internal part by an air gap; said first internal part having a maximum diameter substantially less than a minimum diameter of said second external part.

* * * * *